US012703668B2

(12) United States Patent
Liu et al.

(10) Patent No.: US 12,703,668 B2
(45) Date of Patent: Aug. 11, 2026

(54) HAFNON AND ZIRCON ENVIRONMENTAL BARRIER COATINGS FOR SILICON-BASED COMPONENTS

(71) Applicant: RTX Corporation, Farmington, CT (US)

(72) Inventors: Xuan Liu, Glastonbury, CT (US); James T. Beals, West Hartford, CT (US); Xia Tang, West Hartford, CT (US); Richard Wesley Jackson, III, Mystic, CT (US); William J. Joost, San Jose, CA (US)

(73) Assignee: RTX Corporation, Farmington, CT (US)

(*) Notice: Subject to any disclaimer, the term of this patent is extended or adjusted under 35 U.S.C. 154(b) by 325 days.

(21) Appl. No.: 18/533,791

(22) Filed: Dec. 8, 2023

(65) Prior Publication Data

US 2024/0182372 A1 Jun. 6, 2024

Related U.S. Application Data

(62) Division of application No. 17/401,545, filed on Aug. 13, 2021, now Pat. No. 11,866,379.

(Continued)

(51) Int. Cl.

*C04B 41/45* (2006.01)
*C04B 35/78* (2006.01)

(Continued)

(52) U.S. Cl.

CPC .......... *C04B 41/4545* (2013.01); *C04B 35/78* (2013.01); *C04B 41/4527* (2013.01);

(Continued)

(58) Field of Classification Search

None

See application file for complete search history.

(56) References Cited

U.S. PATENT DOCUMENTS

| | | | |
|---|---|---|---|
| 7,951,459 | B2 | 5/2011 | Tang et al. |
| 8,153,204 | B2 | 4/2012 | Kulkarni |

(Continued)

FOREIGN PATENT DOCUMENTS

| | | | |
|---|---|---|---|
| EP | 0262844 | A2 | 4/1988 |
| EP | 1734146 | A1 | 12/2006 |

(Continued)

OTHER PUBLICATIONS

Chong Wang et al., "The Zirconia-Hafnia System: DTA Measurements and Thermodynamic Calculations". Journal of the American Ceramic Society, Oct. 2006, pp. 3751-3758, vol. 89—No. 12, John Wiley & Sons, Inc., Hoboken, New Jersey.

(Continued)

*Primary Examiner* — David Sample

(74) *Attorney, Agent, or Firm* — Bachman & LaPointe, P.C.

(57) ABSTRACT

A method for coating a substrate includes spraying a combination of powders. The combination of powders includes: $Hf_{0.5}Si_{0.5}O_2$; $Zr_{0.5}Si_{0.5}O_2$; and, optionally, at least one of $HfO_2$ and $ZrO_2$. A molar ratio of said $Hf_{0.5}Si_{0.5}O_2$ and $HfO_2$ combined to said $Zr_{0.5}Si_{0.5}O_2$ and $ZrO_2$ combined is from 2:1 to 4:1. A molar ratio of said $Hf_{0.5}Si_{0.5}O_2$ to said $HfO_2$ is at least 1:3.

20 Claims, 4 Drawing Sheets

Related U.S. Application Data

(60) Provisional application No. 63/065,718, filed on Aug. 14, 2020.

(51) Int. Cl.

| | |
|---|---|
| ***C04B 41/50*** | (2006.01) |
| ***C04B 41/51*** | (2006.01) |
| ***C04B 41/52*** | (2006.01) |
| ***C04B 41/90*** | (2006.01) |

(52) U.S. Cl.

CPC ...... *C04B 41/4582* (2013.01); *C04B 41/5024* (2013.01); *C04B 41/5042* (2013.01); *C04B 41/5144* (2013.01); *C04B 41/526* (2013.01); *C04B 41/90* (2013.01)

(56) References Cited

U.S. PATENT DOCUMENTS

| | | | |
|---|---|---|---|
| 9,975,812 | B2 | 5/2018 | Doesburg et al. |
| 10,072,520 | B2 | 9/2018 | Pisacreta et al. |
| 10,107,137 | B2 | 10/2018 | Tolpygo et al. |
| 10,577,950 | B2 | 3/2020 | Landwehr et al. |
| 2006/0280952 | A1 | 12/2006 | Hazel et al. |
| 2006/0280954 | A1 | 12/2006 | Spitsberg et al. |
| 2007/0065672 | A1 | 3/2007 | Bhatia et al. |
| 2007/0111013 | A1 | 5/2007 | Bhatia et al. |
| 2008/0124548 | A1 | 5/2008 | Sporer et al. |
| 2009/0324930 | A1 | 12/2009 | Tulyani et al. |
| 2010/0080984 | A1* | 4/2010 | Lee ........................ C04B 41/009 427/419.4 |
| 2011/0151239 | A1 | 6/2011 | Lane et al. |
| 2014/0072816 | A1 | 3/2014 | Lee |
| 2015/0068188 | A1 | 3/2015 | Tolpygo et al. |
| 2015/0354392 | A1 | 12/2015 | Lipkin et al. |
| 2016/0265367 | A1 | 9/2016 | Rosenzweig et al. |
| 2018/0370862 | A1 | 12/2018 | Kirby |
| 2019/0119803 | A1 | 4/2019 | Tang et al. |
| 2020/0024974 | A1 | 1/2020 | Jackson |
| 2020/0157963 | A1 | 5/2020 | Smyth et al. |

FOREIGN PATENT DOCUMENTS

| | | | |
|---|---|---|---|
| EP | 1764351 | A2 | 3/2007 |
| EP | 1865150 | A1 | 12/2007 |
| EP | 3037394 | A1 | 6/2016 |
| WO | 2022/026115 | A1 | 2/2022 |

OTHER PUBLICATIONS

Agustin Cota et al., "Solution Properties of the System ZrSiO4—HfSiO4: A Computational and Experimental Study", Journal of Physical Chemistry, May 2013, pp. 10013-10019, ACS Publications, Washington, D.C.

Kikuo Nakano et al., "Thermodynamics of Zr/Hf-Mixed Silicates as a Potential for Environmental Barrier Coatings for Tyranno-Hex Materials", Surface & Coatings Technology, 2009, pp. 1997-2002, Elsevier, Amsterdam, Netherlands.

U.S. Office action dated Mar. 26, 2020 for U.S. Appl. No. 16/038,723.

EP Search Report and Opinion dated Dec. 5, 2019 for European Patent Application No. 19183339.1.

European Search Report dated Jan. 27, 2022 for European Patent Application No. 21191490.8.

Notice of Allowance dated Aug. 25, 2023 for U.S. Appl. No. 17/401,545.

Extended European Search Report dated May 28, 2024 for European Patent Application No. 24157077.9.

* cited by examiner

HAFNON AND ZIRCON ENVIRONMENTAL BARRIER COATINGS FOR SILICON-BASED COMPONENTS

CROSS-REFERENCE TO RELATED APPLICATION

This is a divisional of U.S. patent application Ser. No. 17/401,545, filed Aug. 13, 2021, and entitled "Hafnon and Zircon Environmental Barrier Coatings for Silicon-Based Components", which claims benefit of U.S. Patent Application No. 63/065,718, filed Aug. 14, 2020, and entitled "Hafnon and Zircon Environmental Barrier Coatings for Silicon-Based Components", the disclosures of which applications are incorporated by reference herein in their entireties as if set forth at length.

BACKGROUND

The disclosure relates to gas turbine engines. More particularly, the disclosure relates to barrier coatings for silicon-based (e.g., ceramic matrix composite (CMC)) substrates.

Gas turbine engines (used in propulsion and power applications and broadly inclusive of turbojets, turboprops, turbofans, turboshafts, industrial gas turbines, and the like) are beginning to include components made of CMC.

Traditional ceramics used on metallic substrates have disadvantages when applied to ceramic matrix composite (CMC) substrates. Specifically, stabilized zirconia (YSZ), which is used with metallic substrates has a coefficient of thermal expansion (CTE) that is much greater than that of CMC substrates. As a result, YSZ is susceptible to cracking and spallation during operation in a turbine engine. For CMC substrates, Zr, Hf, and rare earth silicate abradable coatings have been proposed to better match CTE. These may involve coatings that have porosity greater than 10 vol. % to enable wear. United States Patent Application Publication 20200055789A1 (the '789 publication), of Smyth, published Feb. 20, 2020, and entitled "Protective Coating for Ceramic Matrix Composites", the disclosure of which is incorporated by reference in its entirety herein as if set forth at length, discloses use of hafnium silicate and ytterbium disilicate plus barium magnesium alumino silicate (BMAS) as a coating for a CMC BOAS segment.

United States Patent Application Publication 2007/0065672A1 (the '672 publication), of Bhatia et al., Mar. 22, 2007, "Silicon Based Substrate with Hafnium Containing Barrier Layer" discloses hafnium silicate (hafnon or $HfSiO_4$ or, in single cation notation, $Hf_{0.5}Si_{0.5}O_2$) coatings used on CMC substrates. The '672 publication identifies variations including use of an oxide as a "thermal expansion (CTE) tailoring additive". Additionally, mixtures of hafnon and zirconium silicate (zircon or $ZrSiO_4$ or, in single cation notation, $Zr_{0.5}Si_{0.5}O_2$) are disclosed.

United States Patent Application Publication 2020/0024974A1 (the '974 publication), of Jackson, Jan. 23, 2020, "Environmental Barrier Multi-Phase Abradable Coating" discloses an abradable coating using a dislocator phase disbursed in a ceramic matrix. The dislocator phase includes zircon. The '974 publication discusses loss of silicon from an exposed zircon surface causing the zircon to become zirconia ($ZrO_2$).

SUMMARY

One aspect of the disclosure involves a method for coating a substrate. The method comprises spraying a combination of powders. The combination of powders comprises: $Hf_{0.5}Si_{0.5}O_2$; $Zr_{0.5}Si_{0.5}O_2$; and, optionally, at least one of $HfO_2$ and $ZrO_2$. A molar ratio of said $Hf_{0.5}Si_{0.5}O_2$ and $HfO_2$ combined to said $Zr_{0.5}Si_{0.5}O_2$ and $ZrO_2$ combined is from 2:1 to 4:1 (e.g., exactly). A molar ratio of said $Hf_{0.5}Si_{0.5}O_2$ to said $HfO_2$ is at least 1:3 (e.g., exactly).

In a further embodiment of any of the foregoing embodiments, additionally and/or alternatively, said molar ratio of said $Hf_{0.5}Si_{0.5}O_2$ and $HfO_2$ combined to said $Zr_{0.5}Si_{0.5}O_2$ and $ZrO_2$ combined is from 7:3 to 3:1 (e.g., exactly).

In a further embodiment of any of the foregoing embodiments, additionally and/or alternatively, the combination of powders comprises said $HfO_2$ at a single cation molarity of 0.10 to 0.45.

In a further embodiment of any of the foregoing embodiments, additionally and/or alternatively, the combination of powders further comprises said $ZrO_2$ at a single cation molarity of 0.050 to 0.150.

In a further embodiment of any of the foregoing embodiments, additionally and/or alternatively, a molar ratio of said $HfO_2$ to said $ZrO_2$ is at least 2:1.

In a further embodiment of any of the foregoing embodiments, additionally and/or alternatively, said molar ratio of said $HfO_2$ to said $ZrO_2$ is from 2:1 to 5:1.

In a further embodiment of any of the foregoing embodiments, additionally and/or alternatively, said molar ratio of said $HfO_2$ to said $ZrO_2$ is higher than a molar ratio of said $Hf_{0.5}Si_{0.5}O_2$ to said $Zr_{0.5}Si_{0.5}O_2$.

In a further embodiment of any of the foregoing embodiments, additionally and/or alternatively, the combination of powders comprises in single cation mol percent at least 95.0% combined said $Hf_{0.5}Si_{0.5}O_2$, said $Zr_{0.5}Si_{0.5}O_2$, and said at least one of $HfO_2$ and $ZrO_2$, if either.

In a further embodiment of any of the foregoing embodiments, additionally and/or alternatively, the combination of powders further comprises CaO, $AlO_{1.5}$, and $SiO_2$.

In a further embodiment of any of the foregoing embodiments, additionally and/or alternatively, the spraying is of layer and the method further comprises at least one of: applying a bond coat before the spraying; and applying a further layer after the spraying.

In a further embodiment of any of the foregoing embodiments, additionally and/or alternatively, the method includes applying the further layer wherein the further layer is an abradable layer applied by air plasma spray.

In a further embodiment of any of the foregoing embodiments, additionally and/or alternatively, the method includes applying the further layer wherein the further layer has greater porosity than a layer formed by said spraying said combination of powders.

A further aspect of the disclosure involves a coated substrate comprising: a substrate; and a coating layer atop the substrate. The coating comprises: at least 25.0 volume %, exclusive of porosity, a first phase being a solid solution of $Hf_{1-x}Zr_xSiO_4$; and at least 25.0 volume %, exclusive of porosity, a second phase being a solid solution of $Hf_{1-y}Zr_yO_2$.

In a further embodiment of any of the foregoing embodiments, additionally and/or alternatively, one or more of: the substrate is a CMC; the substrate is silicon-based; a bond coat is between the substrate and the layer; and the layer is between the substrate and a second layer.

In a further embodiment of any of the foregoing embodiments, additionally and/or alternatively, the coating layer comprises: at least 50.0 volume %, exclusive of porosity, said first phase; and at least 25.0 volume %, exclusive of porosity, said second phase.

In a further embodiment of any of the foregoing embodiments, additionally and/or alternatively, the x in the $Hf_{1-x}Zr_xSiO_4$ is between 0.20 and 0.40 inclusive; and the y in the $Hf_{1-y}Zr_yO_2$ is less than the x.

In a further embodiment of any of the foregoing embodiments, additionally and/or alternatively, the coated substrate further comprises an additional coating layer atop the coating layer. The additional coating layer comprises: at least 25.0 volume %, exclusive of porosity, a first phase being a solid solution of $Hf_{1-x}Zr_xSiO_4$; and at least 5.0 volume %, exclusive of porosity, a second phase being a solid solution of $Hf_{1-y}Zr_yO_2$, wherein the additional coating layer has a lower volume ratio of the $Hf_{1-y}Zr_yO_2$ to the $Hf_{1-x}Zr_xSiO_4$.

In a further embodiment of any of the foregoing embodiments, additionally and/or alternatively, the coated substrate further comprises: an additional coating layer atop the coating layer and comprising: at least 25.0 volume %, exclusive of porosity, a first phase being a solid solution of $Hf_{1-x}Zr_xSiO_4$; and at least 5.0 volume %, exclusive of porosity, a second phase being a solid solution of $Hf_{1-y}Zr_yO_2$, wherein the additional coating layer further comprises a dislocator phase as a third phase.

In a further embodiment of any of the foregoing embodiments, additionally and/or alternatively, the dislocator phase is present at 2.0% to 40.0% total volume in the additional layer.

In a further embodiment of any of the foregoing embodiments, additionally and/or alternatively, the dislocator phase comprises alkaline earth or transition metal (M) tungstates ($MWO_4$), alkaline earth molybdates ($MMoO_4$), rare earth (RE) phosphates ($REPO_4$) and combinations thereof at said 2.0% to 40.0% total volume in the additional layer.

The details of one or more embodiments are set forth in the accompanying drawings and the description below. Other features, objects, and advantages will be apparent from the description and drawings, and from the claims.

BRIEF DESCRIPTION OF THE DRAWINGS

The views are schematic in nature and not necessary to scale. Like reference numbers and designations in the various drawings indicate like elements.

DETAILED DESCRIPTION

Figure 1:
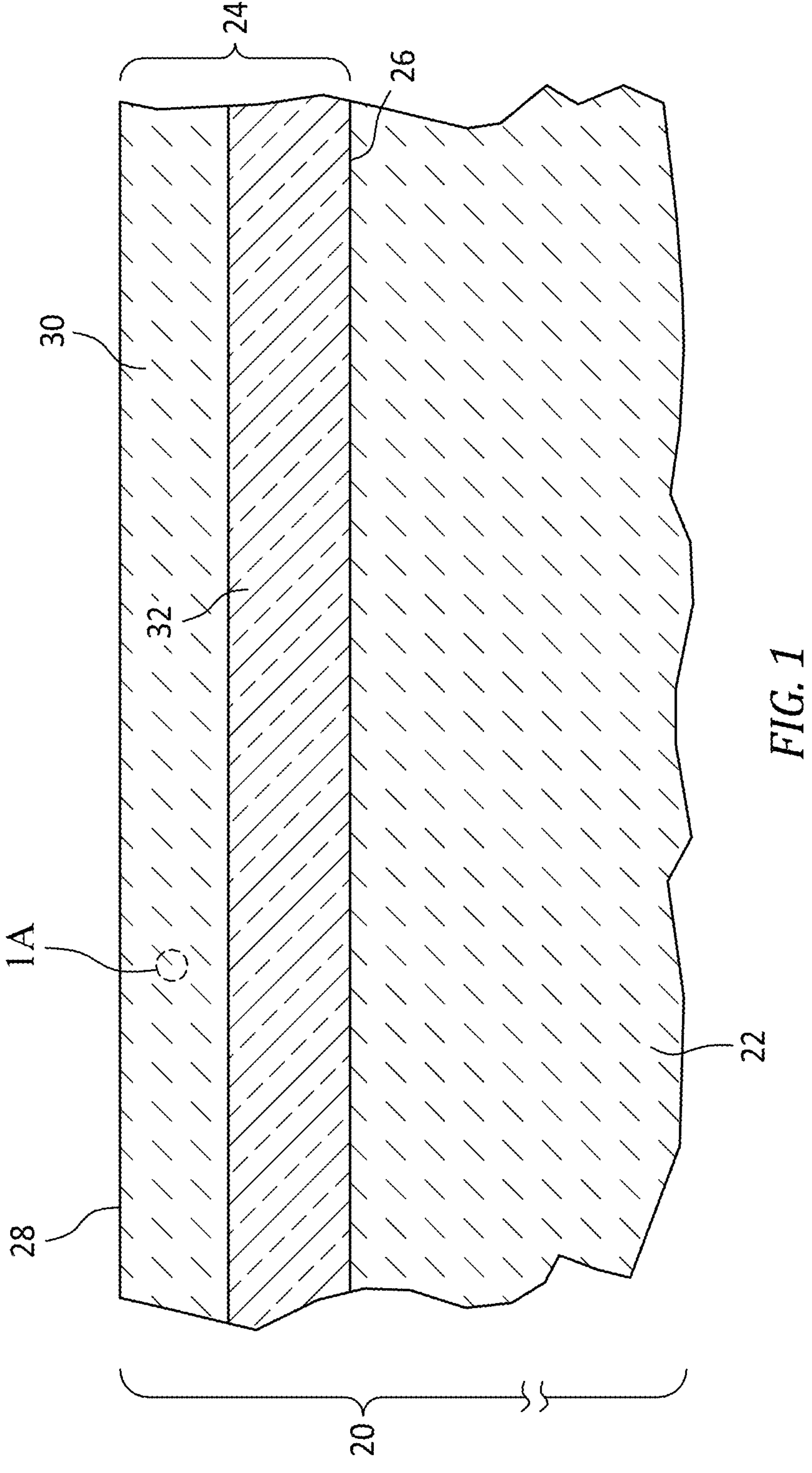
FIG. 1 is a sectional view of barrier-coated substrate in a gas turbine engine.

Zircon is much less expensive than hafnon and initially may provide similar protection to silicon-based substrates as hafnon. However, residual zirconia in zircon-based coatings can bring with it undesirable phase transformations during cyclic operations of a gas turbine.

Between room temperature (21° C.) and about 1600° C., hafnia ($HfO_2$) exists in the monoclinic phase. This encompasses the range of temperatures experienced during engine service. In contrast, zirconia transforms from the monoclinic phase to the tetragonal phase at temperatures above 1000° C. In operation zirconia would be expected to transform from monoclinic to tetragonal upon heating and then back to monoclinic upon cooling. The tetragonal to monoclinic phase transformation results in a 3% volume increase that induces cracking, which would result in loss of mechanical integrity.

Currently, it is not possible to eliminate residual zirconia completely from a zircon-based coating due to manufacturing challenges and eventual recession of silica ($SiO_2$) from the surface of the coating. Therefore, the use of zircon by itself will lead to extremely low durability coatings.

When zircon is added to hafnon, the hafnon may help suppress the residual zirconia from transforming between its low and high temperature polymorphs. A spray of mixed hafnon and zircon feedstock suffers silicon depletion Therefore, a coating produced using raw materials of zircon and hafnon will produce a coating consisting of a zircon-hafnon (hafnon-zircon—order not indicating relative content) solid solution with residual hafnia-zirconia (zirconia-hafnia) solid solution. With a mixture, the silicon will deplete from the hafnon at a similar rate to zircon, producing a hafnia-zirconia phase within the hafnon-zircon phase. An approximate rule of mixtures applies to the stability temperature of the hafnia-zirconia relative to the respective values of about 1600° C. and 1000° C. Wang, Chong & Zinkevich, Matvei & Aldinger, Fritz. "The Zirconia-Hafnia System: DTA Measurements and Thermodynamic Calculations". Journal of the American Ceramic Society, October, 2006, pp. 3751-3758, vol. 89-no. 12, John Wiley & Sons, Inc., Hoboken, New Jersey.

An exemplary target operating temperature is 2700° F. (1482° C.). At that temperature, a moderate amount of zirconia in the hafnia-zirconia system will be acceptable while still avoiding the polymorph transition. Hafnon-zircon compositions with up to 40% zircon in the hafnon-zircon silicate phase (single cation molarity) will form residual zirconia that is in solid solution with hafnia ($HfO_2$) and which should not transform if the coating surface temperature is kept below approximately 2700° F. (1482° C.). Thus, such coating should be stable thermally up to 2700° F. (1482° C.).

More particularly, both zirconia-hafnia and zircon-hafnon mixtures are reported to form single-phase solid-solutions across the binary. The monoclinic to tetragonal transformation of $Zr_xHf_{1-x}O_2$ mixtures increases continuously with x. When $x \leq 0.30$ the monoclinic to tetragonal transformation temperature is above 2700° F. (1482° C.). This suggests that a $Zr_xHf_{1-x}SiO_4$ coating with $x \leq 0.30$ would have enhanced durability relative to mixtures with $x > 0.30$. Si loss would result in $Zr_xHf_{1-x}O_2$ mixtures that are not susceptible to phase transformation-induced degradation. Compositions $0.25 \leq x \leq 0.30$ would have the best cost/property balance, more broadly $0.20 \leq x \leq 0.33$ (2:1 to 4:1 Hf to Zr).

Exemplary application techniques are thermal spray of source powders. The powders (e.g., hafnon and zircon) may be pre blended or they may have separate feeds, mixing in the plasma. An exemplary thermal spray is air plasma spray of dry (distinguished from suspension plasma spray) powders (e.g., pre-blended or not). When deposited, the hafnon and zircon phases will mix into a single first phase, as will the hafnia and zirconia phases into a second single phase. Even if a pure hafnon-zircon mixture is used (no hafnia and/or zirconia), there typically will be one or more stages of silicon depletion/attrition. For example, during deposition, about 10% of hafnon and zircon is transformed to zirconia or hafnia due to Si vaporization in the plasma.

Additionally, $Zr_yHf_{1-y}O_2$—$Zr_xHf_{1-x}SiO_4$ mixtures sprayed using added zirconia and hafnia feedstock will have enhanced recession resistance relative to $Zr_xHf_{1-x}SiO_4$. This is because $Zr_yHf_{1-y}O_2$ is not susceptible to recession because the vapor pressure of $Zr(OH)_4$ and $Hf(OH)_4$, in equilibrium with $Zr_yHf_{1-y}O_2$ and the combustion environment, is very low.

FIG. 1 shows a coated article 20 comprising a substrate 22 and a coating system 24 atop a surface 26 of the substrate and extending to an outer surface 28. The exemplary substrate is a ceramic matrix composite (CMC) such as a SiC—SiC composite (see the '789 publication) or a monolithic ceramic. The coating system 24 includes a barrier layer (barrier coating) 30. The exemplary FIG. 1 coating system includes a bond coat 32 directly atop the substrate surface. The bond coat is optional. However, further variations may include additional layers.

Exemplary bond coat thickness is 50 micrometers to 250 micrometers, more particularly 100 micrometers to 200 micrometers Exemplary barrier coat thickness is 25 micrometers to 200 micrometers, more particularly 75 micrometers to 150 micrometers.

Figure 2:
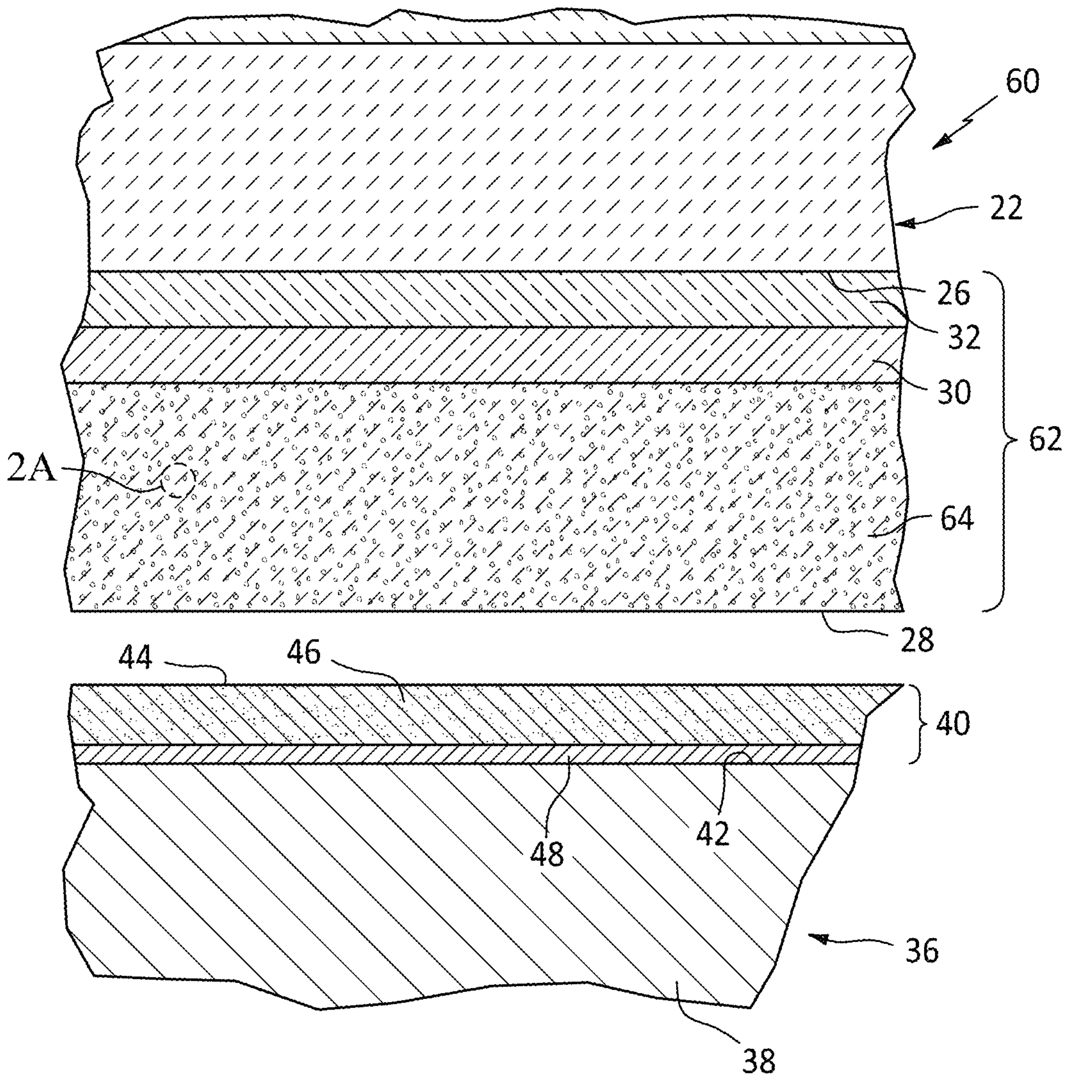
FIG. 2 is a sectional view of an abradable/abrasive interaction in a gas turbine engine.

FIG. 2 shows an additional abradable layer 64 (in a coating system 62 of a coated article 60 otherwise similar to coated article 20) in addition to the bond coat 32 and the barrier layer 30. Exemplary abradable layer thickness is 200 micrometers to 1000 micrometers, more particularly 300 micrometers to 800 micrometers (e.g., and thicker than all remaining layers individually and, optionally, combined).

The article 60 interfaces with a second article 36 comprising a substrate 38 and a coating system 40 atop a surface 42 of the substrate and extending to an outer surface 44. The exemplary substrate 38 is a metallic substrate such as a nickel-based superalloy. The coating system 40 includes an abrasive layer (abrasive coating) 46. The exemplary coating system 40 includes a bond coat 48 directly atop the substrate surface. An exemplary abrasive layer comprises a cubic boron nitride (cBN) abrasive in a metallic (e.g., MCrAlY) matrix. An exemplary abrasive layer application is via electrolytic deposition (plating) of the metal (M-Ni and/or Co and/or Fe) with the addition of the abrasive (e.g., cBN) particles and with or without the addition of metal particles (e.g., the CrAlY) required in order to achieve an alloyed matrix. An exemplary bond coat 48 is Ni (e.g., essentially pure such as at least 95.0% or at least 99.0% Ni by weight). An exemplary Ni bond coat application is via electrolytic deposition.

In one group of examples, the article 20 is a blade or vane with the coating system 24 being along a gaspath-facing portion of the article (e.g., airfoil pressure and/or suction side, inner diameter platform outer diameter surface, outer diameter shroud inner diameter surface and the like.

In another group of examples, the first article 60 is a blade outer airseal (BOAS) or segment thereof with the surfaces 26 and 28 at least locally being inner diameter (ID) surfaces. The second article 36 is a blade of a blade stage with the surfaces 42 and 44 being tip/outer diameter (OD) surfaces.

Figure 1A:
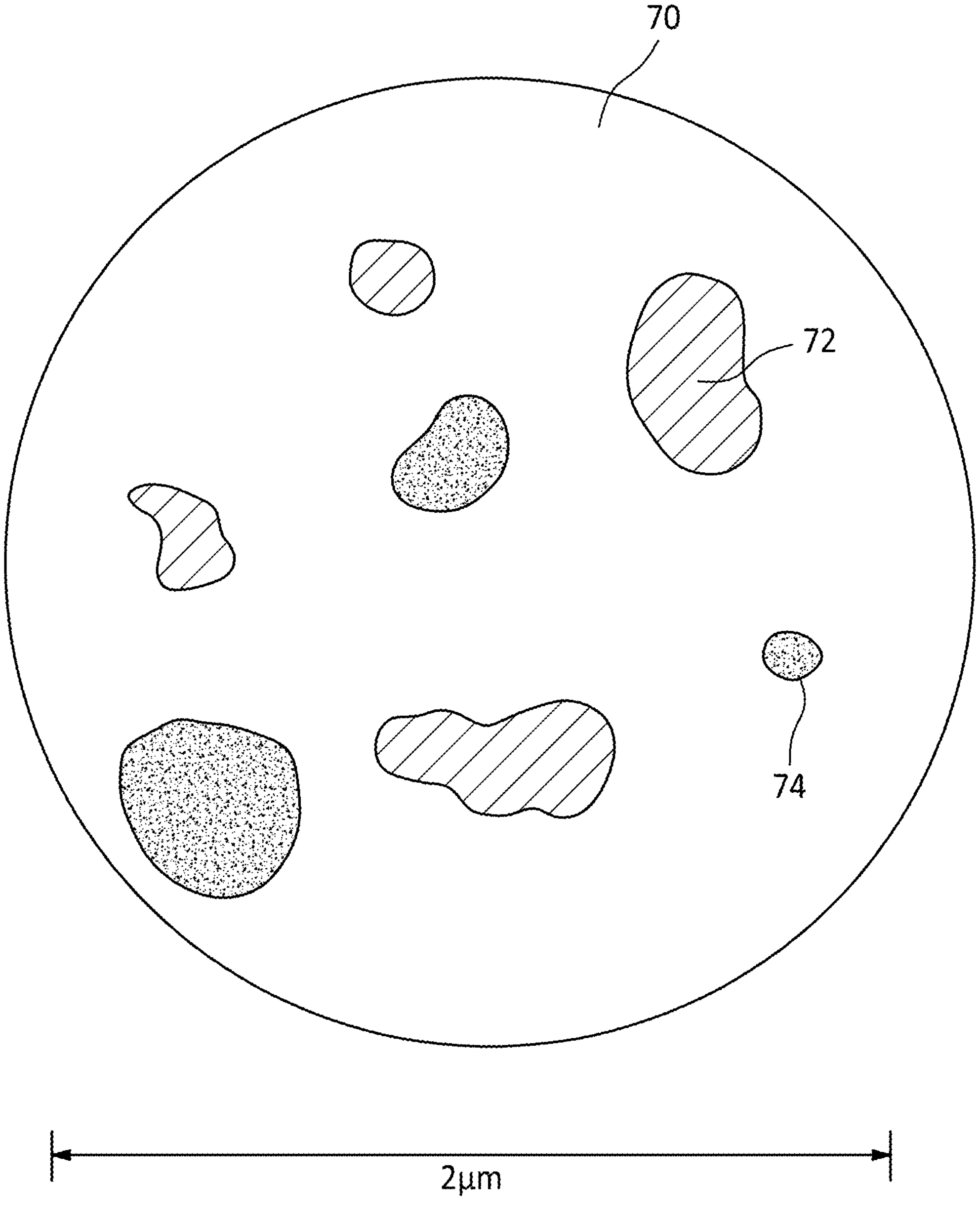
FIG. 1A is an enlarged view of a barrier coating layer.

As is discussed below, the barrier layer 30 (FIG. 1A) comprises two distinct phases 70 and 72 in addition to porosity (pores) 74.

Figure 2A:
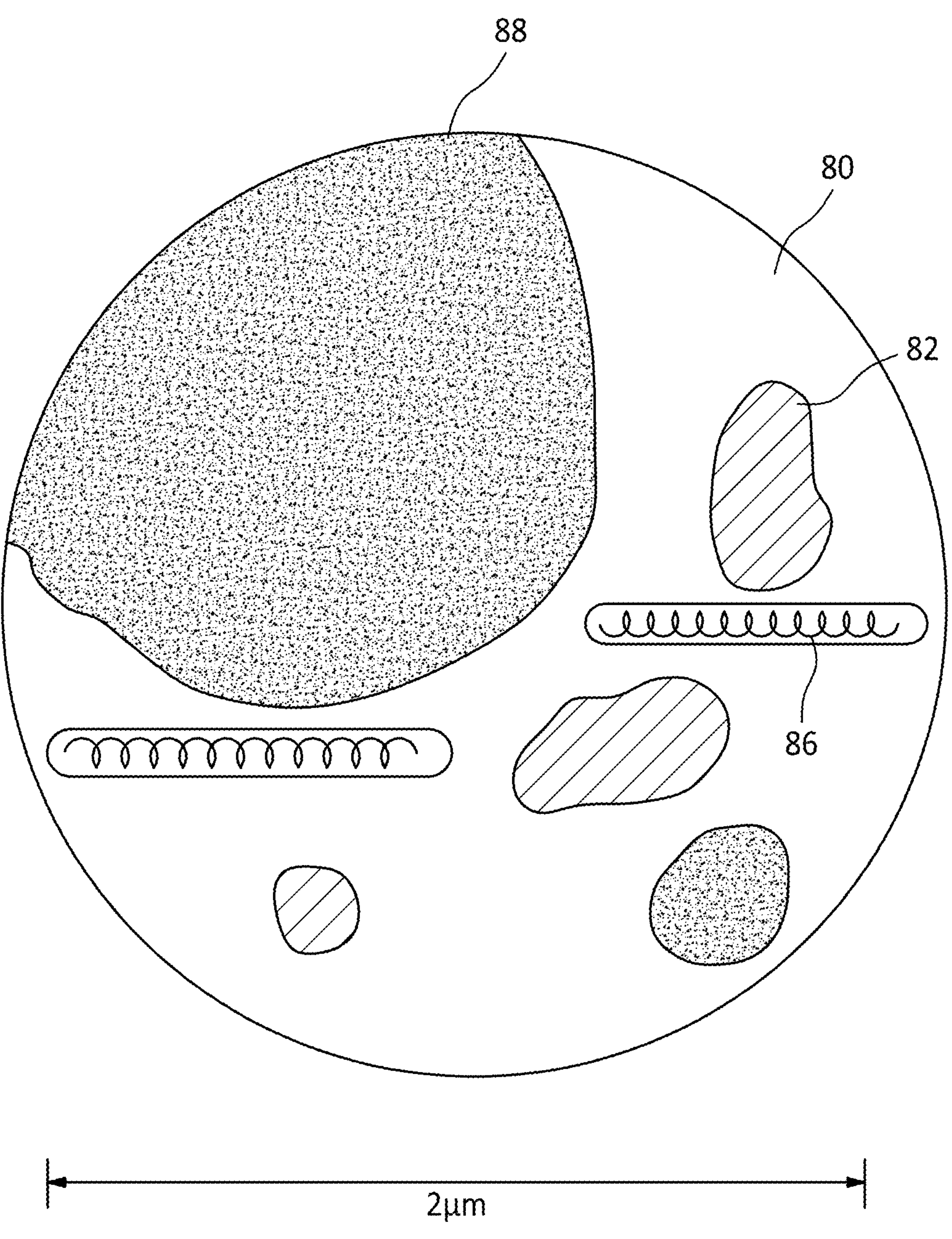
FIG. 2A is a sectional view of an abradable coating layer.

The abradable layer 64 (FIG. 2A) comprises two phases 80 and 82 which may be otherwise respectively similar to 70 and 72 and, optionally, a filler 86 (one or more fillers) in addition to porosity (pores) 88.

Table I below shows examples of various feedstock mixtures used to apply various barrier layers 30 to various substrates. As is seen in the table, single cation molarity concentration is used.

Table II below shows estimated in-service phases in select such barrier layers 30 layers of the Table I coating systems.

Example 1 is a relatively high hafnon barrier coating. The high hafnon renders the coating less prone to monoclinical tetragonal Zr—Hf oxide formation. In general, silicon bond coats may serve to provide oxidation protection at temperatures below 2400° F. (1316° C.). Typically, this will be Si plus impurities. Alternatively, an SiOC-BMAS bond coat may provide protection at temperatures up to about 2700° F. (1482° C.). An exemplary SiOC-BMAS bond coat is 75 vol % SiOC, 20 vol % $SiO_2$ and 5 vol. % BMAS plus impurities (e.g., up to 5.0% or up to 2.0% by volume total impurities as applied. More broadly BMAS may be 2.0-10.0 vol. %; and $SiO_2$ 10.0-50.0 vol. %. In service, the $SiO_2$ content will progressively increase. Thus, as applied, SiOC may be at least 50.0 vol. % or at least 60.0 vol. % but may end up less than 50.0 vol. % in service. Other variations include molybdenum disilicide with glass ceramic additive (e.g., U.S. Pat. No. 7,951,459B2 (the '459 patent), of Tang et al, May 31, 2011 "Oxidation resistant coatings, processes for coating articles, and their coated articles"; United States Patent Application Publication US2019/0119803A1 (the '803 publication), of Tang et al., Apr. 25, 2019, "OXIDATION RESISTANT BOND COAT LAYERS, PROCESSES FOR COATING ARTICLES, AND THEIR COATED ARTICLES", the disclosures of which '459 patent and '803 publication are incorporated by reference in their entireties herein as if set forth at length).

The slight reduction in hafnon content of Example 2 relative to Example 1 may slightly lower cost. However, particularly if compositional tolerances are off, it is more susceptible to degradation.

Examples 3 and 4 involve use of the SiOC-BMAS bond coat that is capable of higher temperature operation.

Examples 7, 5, and 9 are each silicon-lean overall compositions less prone to tetragonal transformation due to the effect of a substantial initial feedstock surplus of hafnia relative to zirconia with the content of $HfO_2$ going from 0% in Example 1, to 10% in Example 7, to 25% in Example 5, to 37.5% in Example 9.

Examples 5-8 involve added hafnia and optionally zirconia in addition to the hafnon and zircon. Comparing Example 5 to Example 1, Example 5 provides a silicon-lean overall composition less prone to tetragonal transformation due to the effect of a substantial initial feedstock surplus of hafnia relative to zirconia.

Example 6 provides a similar silicon-leanness to Example 5 while reducing the cost by substituting a small amount of zirconia for hafnia.

Example 8 provides a similar silicon leanness to Example 9 while reducing the cost by substituting a small amount of zirconia for hafnia.

Examples 8, 9, 10, and 11 involve relatively low total silicon contents. The low silicon content makes the material less susceptible to vaporization but increases the coefficient of thermal expansion (CTE). This trade-off may be favored in some applications. Although Example 9 has a relatively high x value, Example 10 has a relatively high x value in the feedstock. The feedstock y value is much lower and the as-deposited and in-service y values remain less than the x value.

Example 11 represents a high end on feedstock zirconia (limited by monoclinic to tetragonal phase transformation temperature of the $Hf_{1-y}Zr_yO_2$ compound). Example 11 has a relatively high initial oxide content. This would have a relatively high resistance to volatilization. This may be particularly relevant to thin coatings due to the lower CTE mismatch of the zircon-hafnon system to the substrate compared with the relative CTE of the zirconia-hafnia system and substrate.

In further examples, material of Tables I and/or II may be used as a barrier layer serving as an under layer for an abradable layer 64 in an abradable coating system. The abradable layers may be silicates or have silicate matrices. In some embodiments, such silicates may be hafnon-zircon mixtures as outlined for the barrier layer. Table III provides examples of such abradable layers.

These compositions are chosen yield a first phase 70 (FIG. 1A) that is a solid solution of $Hf_{1-x}Zr_xSiO_4$. The first phase is a tetragonal orthosilicate, space group $I4_1/amd$ that consists of $(SiO_4)^{-4}$ tetrahedra that share edges with pseudo-hexagonal $MO_8$ bipyramids along the tetragonal c-axis and share vertices with $MO_8$ bipyramids along the a and b axes, where M can be either Hf of Zr.

Additionally, a second phase 72 is a solid solution of $Hf_{1-y}Zr_yO_2$. Structurally, this is a metal oxide phase with a monoclinic structure, space group $P2_1/c$, in which M ions are 7-fold coordinated with O ions, and M can be either Hf or Zr.

In some embodiments, in both phases, $0.1 \leq x,y \leq 0.5$ and preferably $0.2 \leq x,y \leq 0.40$ or $0.2 \leq x,y \leq 0.3$, because when $x \leq 0.3$, $Hf_{1-y}Zr_yO_2$ transforms into a tetragonal crystal structure at turbine operating temperatures, and subsequently converts to monoclinic $Hf_{1-y}Zr_yO_2$ at colder temperatures. The durability of the coating decreases with the volume of $Hf_{1-y}Zr_yO_2$ that undergoes the tetragonal to monoclinic phase transformation. The tetragonal to monoclinic phase transformation results in a 4.7% volume contraction that can cause the material to crack extensively. In some embodiments discussed below, $y<x$ or $y \ll x$. Thus, y in particular may be zero.

Similarly, as the $Hf_{1-x}Zr_xSiO_4$ is exposed to the combustion gas during turbine operation, Si vaporization drives the formation of $Hf_{1-y}Zr_yO_2$. Again, x,y may be limited to no more than 0.30 to prevent the formation of phase transformable material because the durability of the coating decreases with the volume of $Hf_{1-y}Zr_yO_2$ that under goes the tetragonal to monoclinic phase transformation.

Thus, when Hf and Zr are mixed in a solid solution phase (either $Hf_{1-x}Zr_xSiO_4$ or $Hf_{1-y}Zr_yO_2$) the Zr concentration may be fixed to avoid the deleterious phase transformation.

Thus, in the up-to four-way source combination a molar ratio of $Hf_{0.5}Si_{0.5}O_2$ and $HfO_2$ combined to said $Zr_{0.5}Si_{0.5}O_2$ and $ZrO_2$ is from 2:1 to 3:1 (more narrowly 7:3 to 3:1) and a molar ratio of said $Hf_{0.5}Si_{0.5}O_2$ to said $HfO_2$ is at least 1:2 (more narrowly 2:1 to 5:1). Exemplary content of source powder $HfO_2$ may be at a single cation molarity of 0.10 to 0.45 (more narrowly 0.20 to 0.33). A molar ratio of said $HfO_2$ to said $ZrO_2$ is at least 2:1 but may be much higher. An x value greater than a y value may offer a useful dynamic. If x is 0.30 and there is no hafnia or zirconia in the source material, a y value of 0.30 will arise in the as-applied material due to silicon depletion in the spray and in service. With addition of hafnia feedstock at a y value of less than 0.30, the y value of the hafnia-zirconia from depleted hafnon-zircon will be diluted by the feedstock hafnia-zirconia, and will thus be less than 0.30 in the as-applied and in-service coating.

The resulting coating (or layer) may thus include hafnon-zircon and hafnia-zirconia. The hafnon-zircon may represent at least 25.0% by volume (exclusive of porosity) or at least 30.0%, 40.0%, 50.0%, 60.0%, 70.0%, 80.0%, or 90.0%. The hafnia-zirconia may represent at least 5.0% by volume (exclusive of porosity) or at least 10.0%, 15.0%, 20.0%, or 25.0%. The coating or layer may consist of or consist essentially of (subject to impurities as-applied or in-service accumulated) said hafnon-zircon and hafnia-zirconia or may have intentional additions such as dislocators.

Other non-fugitive or fugitive components may be ignored in the denominator. An exemplary non-fugitive is a three-phase glass (e.g., a $CaO—AlO_{1.5}—SiO_2$ system formed from CaO, $AlO_{1.5}$, and $SiO_2$ in the source powders). This may still make up a small fraction of the non-fugitive (e.g., about 5% or at least 2.0% and up to 8.0% or 10.0%, leaving the aforementioned hafnon, zircon, hafnia, and zirconia at least 90% as-applied ignoring porosity). An exemplary $CaO—AlO_{1.5}—SiO_2$ system is by molarity 24% CaO, 17% $AlO_{1.5}$, and 59% $SiO_2$.

Turning to the abradable coatings of Table III, it is seen that Example 1 would offer a cost reduction with respect to a pure hafnon coating. The slight reduction in hafnon content of Example 2 relative to Example 1 may slightly further lower cost. However, particularly if compositional tolerances are off, Example 2 is more susceptible to degradation. With respect to Example 2, Example 5 offers more volatization resistance due to the addition of $HfO_2$. However, the effective CTE of the coating will be higher due to the $HfO_2$ addition, which makes the coating more prone to thermal stress generation. With respect to Examples 2 and 5, Example 6 offers additional volatization resistance due to the reduction in silicate content, while further reducing cost through the addition of $ZrO_2$. However, the effective CTE of the coating will be higher due to the $HfO_2$ and $ZrO_2$ additions, which makes the coating more prone to thermal stress generation. Example 7 offers even greater volatization resistance due to the greater reduction in silicate content, while further reducing cost through the larger addition of $ZrO_2$ with respect to Example 6.

Regarding possible differences between the barrier layer and abradable layer in situations wherein both comprise zircon-hafnon, there may be a number of differences. One basic difference is greater porosity on the abradable layer than in the barrier layer (e.g., a difference of at least 4.0% or an exemplary 4.0% to 25%). Such may be achieved by the addition of a polymer fugitive powder. In terms of the hafnon-zircon and hafnia-zirconia system, one difference may be in the relative amount of the two phases (hafnon-zircon relative to hafnia-zirconia) or absolute amount of hafnia-zirconia. The abradable layer may have a lower oxide phase content because it is thicker. The thickness raises susceptibility to spallation stresses from CTE mismatch between the substrate and the oxide phase (hafnia-zirconia). An exemplary difference is at least 10.0 volume percent less of the oxide phase. In relative terms, the hafnia-zirconia to hafnon-zircon ratio of the abradable may be an exemplary at least 10% greater for the barrier layer or at least 20% or at least 50%.

In terms of additives, one difference between the barrier layer and the abradable layer may be the presence of hard or soft dislocator phases (e.g., see, U.S. Patent Application No. 63/048,023, filed Jul. 3, 2020, and entitled "Dislocator Chemistries for Turbine Abradable or Machinable Coating Systems", the disclosure of which is incorporated by reference herein in its entirety as if set forth at length, disclosing fillers of alkaline earth or transition metal (M) tungstates ($MWO_4$), alkaline earth molybdates ($MMoO_4$), rare earth (RE) phosphates ($REPO_4$) and combinations thereof; also see United States Patent Application Publication 20190093497A1 (the '497 publication), of Ndamka et al., published Mar. 28, 2019 and entitled "LOW POROSITY ABRADABLE COATING" discloses an abradable coating having a rare earth silicate matrix and dislocator phases of hafnium diboride ($HfB_2$), zirconium diboride ($ZrB_2$), tantalum carbide ($Ta_2C$), titanium diboride ($TiB_2$), zirconium carbide (ZrC), hafnium carbide (HfC), tantalum diboride ($TaB_2$), hafnium nitride (HfN), tantalum nitride (TaN or $Ta_2N$), niobium carbide (NbC), or combinations thereof) as the filler 86 in the abradable. Exemplary dislocator phases represent 2.0% to 40.0% total volume (inclusive of porosity) of the abradable layer, more particularly 5.0% to 30.0% or 5.0% to 20.0%.

Among further alternatives, other silicon containing substrates beyond the SiC—SiC ceramic matrix composites include monolithic SiC or SiN, Si—SiC composites, and the like.

TABLE I

Barrier Coating Application Parameters

| | | Bond coat | | | Barrier Coat: Feedstock-1 | | Feedstock-2 | | Feedstock-3 | | Feedstock-4 | | | | |
|---|---|---|---|---|---|---|---|---|---|---|---|---|---|---|---|
| Ex. | Substrate | Material | Method | Thickness mils | Material | mol frac | Material | mol frac | Material | mol frac | Material | mol frac | Porosity | Thickness mils | Method |
| 1 | SiC—SiC | Si | APS | 2 | $Hf_{0.5}Si_{0.5}O_2$ | 0.75 | $Zr_{0.5}Si_{0.5}O_2$ | 0.25 | | | | | 3% | 5 | APS |
| 2 | SiC—SiC | Si | APS | 2 | $Hf_{0.5}Si_{0.5}O_2$ | 0.70 | $Zr_{0.5}Si_{0.5}O_2$ | 0.30 | | | | | 3% | 5 | APS |
| 3 | SiC—SiC | SiOC-BMAS | Slurry | 5 | $Hf_{0.5}Si_{0.5}O_2$ | 0.75 | $Zr_{0.5}Si_{0.5}O_2$ | 0.25 | | | | | 3% | 5 | APS |
| 4 | SiC—SiC | SiOC-BMAS | Slurry | 5 | $Hf_{0.5}Si_{0.5}O_2$ | 0.70 | $Zr_{0.5}Si_{0.5}O_2$ | 0.30 | | | | | 3% | 5 | APS |
| 5 | SiC—SiC | SiOC-BMAS | Slurry | 5 | $Hf_{0.5}Si_{0.5}O_2$ | 0.50 | $Zr_{0.5}Si_{0.5}O_2$ | 0.25 | $HfO_2$ | 0.250 | | | 3% | 5 | APS |
| 6 | SiC—SiC | SiOC-BMAS | Slurry | 5 | $Hf_{0.5}Si_{0.5}O_2$ | 0.50 | $Zr_{0.5}Si_{0.5}O_2$ | 0.25 | $HfO_2$ | 0.175 | $ZrO_2$ | 0.075 | 3% | 5 | APS |
| 7 | SiC—SiC | SiOC-BMAS | Slurry | 5 | $Hf_{0.5}Si_{0.5}O_2$ | 0.650 | $Zr_{0.5}Si_{0.5}O_2$ | 0.250 | $HfO_2$ | 0.100 | | | 3% | 5 | APS |
| 8 | SiC—SiC | SiOC-BMAS | Slurry | 5 | $Hf_{0.5}Si_{0.5}O_2$ | 0.333 | $Zr_{0.5}Si_{0.5}O_2$ | 0.167 | $HfO_2$ | 0.400 | $ZrO_2$ | 0.10 | 3% | 5 | APS |
| 9 | SiC—SiC | SiOC-BMAS | Slurry | 5 | $Hf_{0.5}Si_{0.5}O_2$ | 0.35 | $Zr_{0.5}Si_{0.5}O_2$ | 0.275 | $HfO_2$ | 0.375 | | | 3% | 5 | APS |
| 10 | SiC—SiC | SiOC-BMAS | Slurry | 5 | $Hf_{0.5}Si_{0.5}O_2$ | 0.25 | $Zr_{0.5}Si_{0.5}O_2$ | 0.25 | $HfO_2$ | 0.400 | $ZrO_2$ | 0.10 | 3% | 5 | APS |
| 11 | SiC—SiC | SiOC-BMAS | Slurry | 5 | $Hf_{0.5}Si_{0.5}O_2$ | 0.20 | $Zr_{0.5}Si_{0.5}O_2$ | 0.05 | $HfO_2$ | 0.500 | $ZrO_2$ | 0.25 | 3% | 5 | APS |

TABLE II

In situ composition

| | Phase 1 | | Phase 2 | |
|---|---|---|---|---|
| Ex. | Material | mol frac | Material | mol frac |
| 1 | $Hf_{0.375}Zr_{0.125}Si_{0.5}O_2$ | 0.90 | $Hf_{0.75}Zr_{0.25}O_2$ | 0.10 |
| 2 | $Hf_{0.35}Zr_{0.15}Si_{0.5}O_2$ | 0.90 | $Hf_{0.7}Zr_{0.3}O_2$ | 0.10 |
| 5 | $Hf_{0.33}Zr_{0.17}Si_{0.5}O_2$ | 0.75 | $Hf_{0.96}Zr_{0.04}O_2$ | 0.25 |
| 6 | $Hf_{0.33}Zr_{0.17}Si_{0.5}O_2$ | 0.75 | $Hf_{0.7}Zr_{0.3}O_2$ | 0.25 |

Among further alternatives, other bond coats include metallic silicon, SiOC/BMAS/$SiO_2$, metal silicide glass-ceramic, and the like.

Among further alternatives, other barrier layers include hafnia, hafnon, zircon, ytterbium disilicate, yttrium disilicate), mullite ($Al_6Si_2O_{13}$), BSAS ($Ba_{0.75}Sr_{0.25}Al_2Si_2O_8$), and combinations thereof, with porosity 1.0-10%, more narrowly 1%-5%.

Among further alternatives, other abradable layers include hafnon, zircon, ytterbium disilicate, yttrium disilicate, BSAS, and combinations thereof, with porosity ranging from 2.0%-25%, more narrowly 12%-25%.

TABLE III

Abradable Coating Application Parameters

| | | Bond coat | | | Abradable: Feedstock-1 | | Feedstock-2 | | Feedstock-3 | | Feedstock-4 | | | | |
|---|---|---|---|---|---|---|---|---|---|---|---|---|---|---|---|
| Ex. | Substrate | Material | Method | Thickness mils | Material | mol frac | Material | mol frac | Material | mol frac | Material | mol frac | Porosity | Thickness mils | Method |
| 1 | SiC-SiC | Si | APS | 2 | $Hf_{0.5}Si_{0.5}O_2$ | 0.80 | $Zr_{0.5}Si_{0.5}O_2$ | 0.20 | | | | | 10% | 25 | APS |
| 2 | SiC-SiC | Si | Slurry | 5 | $Hf_{0.5}Si_{0.5}O_2$ | 0.667 | $Zr_{0.5}Si_{0.5}O_2$ | 0.333 | | | | | 10% | 25 | APS |
| 5 | SiC-SiC | SiOC-BMAS | Slurry | 5 | $Hf_{0.5}Si_{0.5}O_2$ | 0.60 | $Zr_{0.5}Si_{0.5}O_2$ | 0.30 | $HfO_2$ | 0.10 | | | 10% | 15 | APS |
| 6 | SiC-SiC | SiOC-BMAS | Slurry | 5 | $Hf_{0.5}Si_{0.5}O_2$ | 0.50 | $Zr_{0.5}Si_{0.5}O_2$ | 0.25 | $HfO_2$ | 0.175 | $ZrO_2$ | 0.075 | 10% | 15 | APS |
| 7 | SiC-SiC | SiOC-BMAS | Slurry | 5 | $Hf_{0.5}Si_{0.5}O_2$ | 0.333 | $Zr_{0.5}Si_{0.5}O_2$ | 0.167 | $HfO_2$ | 0.333 | $ZrO_2$ | 0.167 | 10% | 10 | APS |

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A coated substrate comprising:
a substrate; and
a coating layer atop the substrate and comprising:
at least 25.0 volume %, exclusive of porosity, a first phase being a solid solution of $Hf_{1-x}Zr_xSiO_4$; and
at least 25.0 volume %, exclusive of porosity, a second phase being a solid solution of $Hf_{1-y}Zr_yO_2$.

2. The coated substrate of claim 1 wherein:
the substrate is a CMC; and
the substrate is silicon-based.

3. The coated substrate of claim 1 wherein:
a bond coat is between the substrate and the coating layer.

4. The coated substrate of claim 1 wherein the coating layer comprises:
at least 50.0 volume %, exclusive of porosity, said first phase; and
at least 25.0 volume %, exclusive of porosity, said second phase.

5. The coated substrate of claim 1 wherein:
the x in the $Hf_{1-x}Zr_xSiO_4$ is between 0.20 and 0.40 inclusive; and
the y in the $Hf_{1-y}Zr_yO_2$ is less than the x.

6. The coated substrate of claim 1 wherein:
the layer is between the substrate and a second coating layer.

7. The coated substrate of claim 6 wherein:
the second coating layer comprises:
at least 25.0 volume %, exclusive of porosity, a first phase being a solid solution of $Hf_{1-x}Zr_xSiO_4$; and
at least 5.0 volume %, exclusive of porosity, a second phase being a solid solution of $Hf_{1-y}Zr_yO_2$, wherein the second coating layer has a lower volume ratio of the $Hf_{1-y}Zr_yO_2$ to the $Hf_{1-x}Zr_xSiO_4$ than does the coating layer.

8. The coated substrate of claim 6 wherein:
the second coating layer comprises:
at least 25.0 volume %, exclusive of porosity, a first phase being a solid solution of $Hf_{1-x}Zr_xSiO_4$; and
at least 5.0 volume %, exclusive of porosity, a second phase being a solid solution of $Hf_{1-y}Zr_yO_2$, wherein the second coating layer further comprises a dislocator phase as a third phase.

9. The coated substrate of claim 8 wherein:
the dislocator phase is present at 2.0% to 40.0% total volume in the second coating layer.

10. The coated substrate of claim 9 wherein:
the dislocator phase comprises alkaline earth or transition metal (M) tungstates ($MWO_4$), alkaline earth molybdates ($MMoO_4$), rare earth (RE) phosphates ($REPO_4$) and combinations thereof at said 2.0% to 40.0% total volume in the second coating layer.

11. The coated substrate of claim 10 wherein:
the dislocator phase comprises rare earth (RE) phosphates ($REPO_4$) at said 2.0% to 40.0% total volume in the second coating layer.

12. The coated substrate of claim 6 wherein the second coating layer comprises:
at least 25.0 volume %, exclusive of porosity, a first phase being a solid solution of $Hf_{1-x}Zr_xSiO_4$; and
at least 25.0 volume %, exclusive of porosity, a second phase being a solid solution of $Hf_{1-y}Zr_yO_2$,
wherein:
the x in the $Hf_{1-x}Zr_xSiO_4$ is between 0.20 and 0.40 inclusive; and
the y in the $Hf_{1-y}Zr_yO_2$ is less than the x.

13. The coated substrate of claim 6 wherein:
the second layer has a greater porosity than said layer.

14. The coated substrate of claim 1 wherein:
the layer is an outermost layer.

15. The coated substrate of claim 14 being a blade outer airseal (BOAS) segment.

16. The coated substrate of claim 15 wherein,
the coating layer further comprises a dislocator phase as a third phase.

17. The coated substrate of claim 16 wherein,
the third phase comprises alkaline earth or transition metal (M) tungstates ($MWO_4$), alkaline earth molybdates ($MMoO_4$), rare earth (RE) phosphates ($REPO_4$) and combinations thereof at 2.0% to 40.0% total volume in the coating layer.

18. The coated substrate of claim 16 wherein,
the third phase comprises alkaline earth or transition metal (M) tungstates ($MWO_4$), alkaline earth molybdates ($MMoO_4$), rare earth (RE) phosphates ($REPO_4$) and combinations thereof at 5.0% to 20.0% total volume in the coating layer.

19. The coated substrate of claim 15 in combination with a blade of a stage of blades facing, the blade having a tip facing an inner diameter (ID) face of the BOAS segment.

20. The coated substrate of claim 1 wherein,
the coating layer further comprises a dislocator phase as a third phase; and
the third phase comprises alkaline earth or transition metal (M) tungstates ($MWO_4$), alkaline earth molybdates ($MMoO_4$), rare earth (RE) phosphates ($REPO_4$) and combinations thereof at 2.0% to 40.0% total volume in the coating layer.

* * * * *